United States Patent
Ozawa et al.

(10) Patent No.: US 7,327,932 B2
(45) Date of Patent: *Feb. 5, 2008

(54) IMAGE APPARATUS WITH ZOOM-IN MAGNIFYING FUNCTION

(75) Inventors: Tsugutaro Ozawa, Mito (JP); Yuzuru Takahashi, Kitaibaraki (JP)

(73) Assignees: Hitachi, Ltd., Tokyo (JP); Hitachi Ulsi Systems Co., Ltd., Tokyo (JP)

( * ) Notice: Subject to any disclaimer, the term of this patent is extended or adjusted under 35 U.S.C. 154(b) by 915 days.

This patent is subject to a terminal disclaimer.

(21) Appl. No.: 10/617,225

(22) Filed: Jul. 11, 2003

(65) Prior Publication Data

US 2004/0105654 A1 Jun. 3, 2004

Related U.S. Application Data

(63) Continuation of application No. 09/231,798, filed on Jan. 15, 1999, now Pat. No. 6,850,689.

(30) Foreign Application Priority Data

Jan. 16, 1998 (JP) .................................. 10-006320

(51) Int. Cl.
    *H04N 5/91* (2006.01)
(52) U.S. Cl. ......................................... 386/46; 386/125
(58) Field of Classification Search ................ 386/46, 386/95, 112, 125; 715/800; 345/660
    See application file for complete search history.

(56) References Cited

U.S. PATENT DOCUMENTS

| 5,073,771 | A | 12/1991 | Satta et al. |
| 5,793,367 | A | 8/1998 | Taguchi |
| 5,945,985 | A | 8/1999 | Babin et al. |
| 5,959,630 | A | 9/1999 | Takeuchi et al. |
| 6,137,469 | A | 10/2000 | Wu et al. |
| 6,215,531 | B1 * | 4/2001 | Beery .......................... 348/734 |
| 6,961,509 | B2 * | 11/2005 | Ozawa et al. .................. 386/46 |
| 7,068,914 | B2 * | 6/2006 | Ozawa et al. .................. 386/46 |

* cited by examiner

*Primary Examiner*—Huy Nguyen
(74) *Attorney, Agent, or Firm*—Antonelli, Terry, Stout & Kraus, LLP.

(57) ABSTRACT

A picture to be reproduced and displayed on a television monitor (10) is discerned as a plurality of partitioned areas in correspondence to keys labeled "1" to "9" disposed on a remote control unit (R). After having zoomed in a picture in a partitioned center area by operating a zoom key disposed on the remote control unit, a partial picture in a partitioned area corresponding to a given one of the keys "1" to "9" is zoomed in with a desired magnification factor in response to operation of the given key. Position of the zoomed-in partial picture on a full screen and the magnification factor thereof can be visually recognized by displaying cursors correspondingly.

6 Claims, 9 Drawing Sheets

IMAGE APPARATUS WITH ZOOM-IN MAGNIFYING FUNCTION

CROSS-REFERENCE TO RELATED APPLICATION

This application is a continuation of Ser. No. 09/231,798 filed 15 Jan. 1999 now U.S. Pat. No. 6,850,689.

BACKGROUND OF THE INVENTION

The present invention relates to a video apparatus such as a DVD (Digital Versatile Disk or Digital Video Disk) player, a DVD recorder and the like. More particularly, the invention is concerned with video apparatuses having improved zoom-in magnifying functions.

In recent years, DVD players have been developed for reproducing a variety of digital information such as musics, motion/still pictures and the like from optical disks. Further, the advent of a DVD recording/reproducing apparatus capable of not only reproducing but also recording various information such as musics, pictures or the like is expected in the not so distant future. Under the circumstances, there exist versatile user's demands on the DVD players which have already been on the market. To say in another way, there exists a demand for realization of the DVD player having a multiplicity of functions.

Figure 7A:
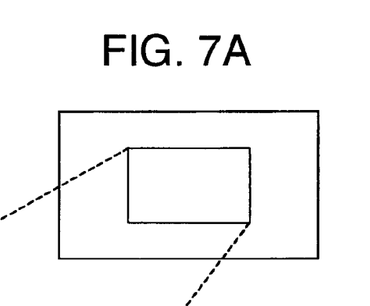
FIG. 7A shows an ordinary picture.
Figure 7B:
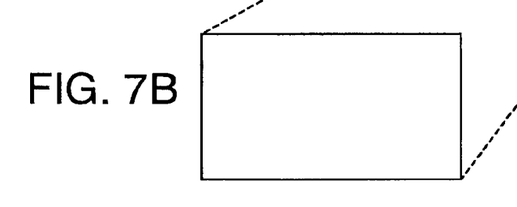
FIG. 7B shows a zoomed-in picture of a partitioned picture area of the ordinary picture.

As one of the numerous functions of the DVD player, the zoom-in magnifying function may be mentioned. For having better understanding of the concept underlying the present invention, description will be made of the zoom-in magnifying function of a conventional DVD player known heretofore by reference to FIGS. 7A and 7B of the accompanying drawings. Incidentally, a remote control unit as usual is provided in association with a DVD player and FIGS. 7A and 7B are schematic view for illustrating the concept of the zoom-in magnifying function adopted in the conventional DVD player.

When a zoom button labeled "ZOOM" disposed on a remote control unit is pushed by user, a center area of a picture displayed fully on a screen of a displaying unit can be viewed with a predetermined magnification, e.g. with a magnification factor "2". In other words, a part or portion of a picture displayed on the screen of the picture unit, as illustrated in FIG. 7A, can be displayed with magnification in such a manner as illustrated schematically in FIG. 7B.

Furthermore, by pushing one of cursor keys labeled "UP", "DOWN", "LEFT" and "RIGHT" on the remote control unit, the picture area to be viewed with magnification (i.e., area indicated as enclosed by a frame in FIG. 7A) can be moved correspondingly. In other words, in the conventional DVD player, a portion of the picture located not only at a center of the on-screen display but also peripheral locations can be viewed in a magnified or zoomed-in state. Thus, an object of interest such as a figure image or the like which the user wants to view can be displayed in detail on a magnified scale.

However, with the zoom-in magnifying function of the conventional video apparatus such as the DVD player described above, lots of time is taken for the selection and the move of a portion of a picture to be viewed due to need for operating the cursor key(s), as a result of which not a little burden is imposed on the user for selecting and positioning a portion of a picture which he or she wants to view. Additionally, the video apparatus known heretofore suffers a problem that the user can not discern with ease to which of portions of the full picture a zoomed-in picture currently displayed on the screen of the displaying unit bears correspondence or relevancy.

SUMMARY OF THE INVENTION

In the light of the state of the art described above, it is an object of the present invention to provide a video apparatus such as a DVD player or the like which allows the user not only to select easily and simply a portion of a picture which he or she wants to view but also to discern clearly the location of a zoomed-in picture being currently displayed as magnified on a full picture or screen of a display unit.

In view of the above and other objects which will become apparent as the description proceeds, there is provided according to an aspect of the present invention a video apparatus which is equipped with facility for reading out first video data from a recording medium and processing the first video data to thereby derive therefrom second video data for generating a zoomed-in picture by magnifying a partial area of a picture based on the first video data. The video apparatus mentioned above includes a zoom key and a plurality of zoom-in area designating keys disposed at least on either one of a main body of the video apparatus or a remote control unit therefor, a storage unit for storing correspondence relations between the plurality of zoom-in area designating keys and areas of the picture based on the first video data, respectively, and a video data processing unit for generating the second video data in response to operation of the zoom key and generating second video data for a zoom-in area corresponding to a given one of the zoom-in area designating keys in response to operation of the given one zoom-in area designating key.

Further, according to another aspect of the invention, there is provided a video apparatus which is equipped with facility for reading out first video data from a recording medium and processing the first video data to thereby derive therefrom second video data for generating a zoomed-in picture by magnifying a partial area of a picture based on the first video data. The video apparatus includes a zoom key and a plurality of zoom-in area designating keys which is disposed at least on either one of a main body of the video apparatus or a remote control unit therefor, a storage unit for storing correspondence relations between the plurality of zoom-in area designating keys and areas of the picture based on the first video data, respectively, and a video data processing unit which is set to a state for generating the second video data upon operation of the zoom-in area designating key in dependence on operation of the zoom key for thereby generating second video data for a zoom-in area corresponding to a given one of the zoom-in area designating keys in response to operation of the given one zoom-in area designating key.

Furthermore, according to yet another aspect of the invention, there is provided a video apparatus which is equipped with facility for reading out first video data from a recording medium and processing the first video data to thereby derive therefrom second video data for generating a zoomed-in picture by magnifying a partial area of a picture based on the first video data. The video apparatus includes a plurality of zoom-in area designating keys disposed at least on either one of a main body of the video apparatus or a remote control unit therefor, a storage unit for storing correspondence relations between the plurality of zoom-in area designating keys and areas of the picture based on the first video data, respectively, and a video data processing unit for generating second video data for a zoom-in area corresponding to a given one of the zoom-in area designating keys in response to operation of the given one zoom-in area designating key.

Additionally, according to still another aspect of the invention, there is provided a video apparatus which is equipped with facility for reading out video data from a recording medium and displaying a zoomed-in magnified picture on a screen of a picture displaying unit on the basis of the video data. The video apparatus includes a plurality of zoom-in area designating keys disposed at least on either one of a main body of the video apparatus or a remote control unit therefor, a storage unit for storing correspondence relations, respectively, between the plurality of zoom-in area designating keys and zoom-in areas resulting from partition of a picture being displayed on the screen on the basis of the video data into a plurality of picture areas, and a video data processing unit for displaying on the screen a zoomed-in picture of a zoom-in area corresponding to a given one of the zoom-in area designating keys in response to operation of the given one zoom-in area designating key.

In addition, according to a further aspect of the invention, there is provided a video apparatus which is equipped with facility for reading out video data from a recording medium and displaying a zoomed-in magnified picture on a screen of a picture displaying unit on the basis of the video data. The video apparatus includes a plurality of zoom-in area designating keys disposed at least on either one of a main body of the video apparatus or a remote control unit therefor, a storage unit for storing correspondence relations, respectively, between the plurality of zoom-in area designating keys and zoom-in areas resulting from partition of a picture being displayed on the screen on the basis of the video data into a plurality of picture areas, and a video data processing unit which is designed such that when a second given one of the zoom-in area designating keys is operated in a state where a zoomed-in picture (first zoom-in magnified picture) of a zoom-in area corresponding to a first given one of the zoom-in area designating keys is being displayed, the second given one zoom-in area designating key differing from the first given zoom-in area designating key, a third zoomed-in picture is displayed which differs from the first zoomed-in picture and a second zoomed-in picture of a zoom-in area corresponding to the second given zoom-in area designating key in precedence to displaying on the screen the second zoomed-in picture of the zoom-in area corresponding to the second zoom-in area designating key operated.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIGS. 3A to 3F are views for illustrating zoom-in operations of picture areas displayed in the DVD player according to the first embodiment of the invention, wherein

FIGS. 7A and 7B are schematic view for illustrating concept of a zoom-in magnifying function adopted in a conventional DVD player, wherein

DESCRIPTION OF THE EMBODIMENTS

The present invention will be described in detail in conjunction with what is presently considered as typical embodiments thereof by reference to the drawings. In the following description, it is to be understood that such terms as "left", "right", "vertical", "horizontal", "upper", "lower" and the like are words of convenience and are not to be construed as limiting terms. Furthermore, the term "picture" is used herein with the intention to cover not only motion pictures but also still pictures, images, graphics and the like visually perceptibles.

In the following description of the preferred embodiments of the invention made by reference to FIGS. 1 to 6, it is assumed that the present invention is applied to DVD (Digital Versatile Disk) players which is a typical one of video apparatuses. It should however be understood that the invention can equally find applications to other various types of video apparatuses.

Figure 2:
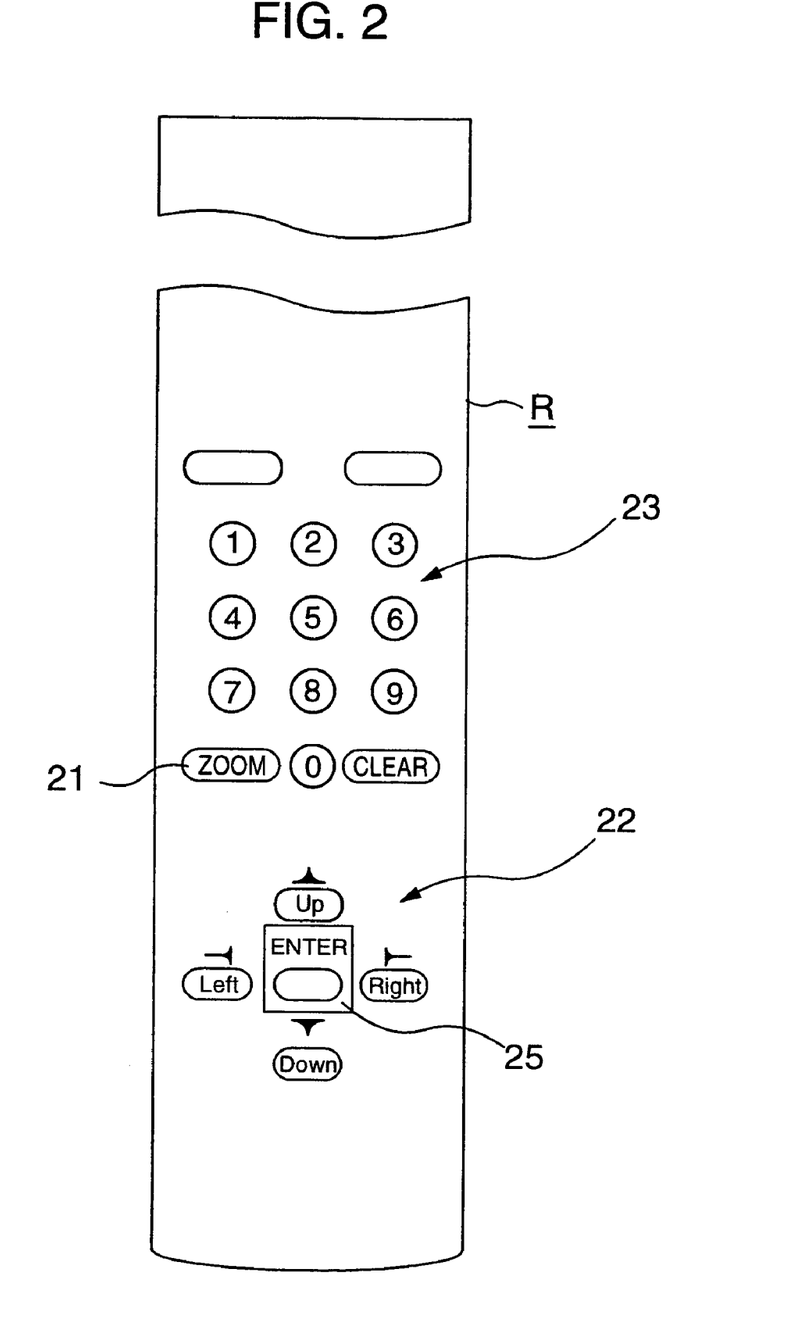
FIG. 2 is an enlarged front view showing graphically a remote control unit which can be used in combination with the DVD players according to the embodiments of the invention and which may be a conventional one.

In general, according to the basic concept underlying the present invention incarnated in the embodiments described below, video data is divided or partitioned into data for a plurality of areas in conformance with zoom-in area designating keys (23) which are disposed on a remote control unit or the like control unit as shown in FIG. 2. In response to user's operation of a given one of the zoom-in area designating keys of the remote control unit, the picture in the partitioned area which corresponds to the given zoom-in area designating key as operated is enlarged or zoomed in with a desired magnification factor. At the same time, the location of the zoomed-in picture on the full on-screen display and the magnification factor are visually indicated in the form of cursors. In this conjunction, a plurality of different magnification factors may be previously set in a system program such that the magnification factors can be changed over sequentially upon every operation of the zoom key (21) of the remote control unit R until the zoom-in magnifying function is finally reset or cleared.

Embodiment 1

At first, a general arrangement of a DVD player according to a first embodiment of the invention will be described by reference to FIG. 1.

The DVD player according to the first embodiment of the invention features a function capable of magnifying or zooming in a specific field or portion of a picture outputted to a picture displaying unit such as a television monitor or the like. This function is also referred to as the zoom-in magnifying function.

Figure 1:
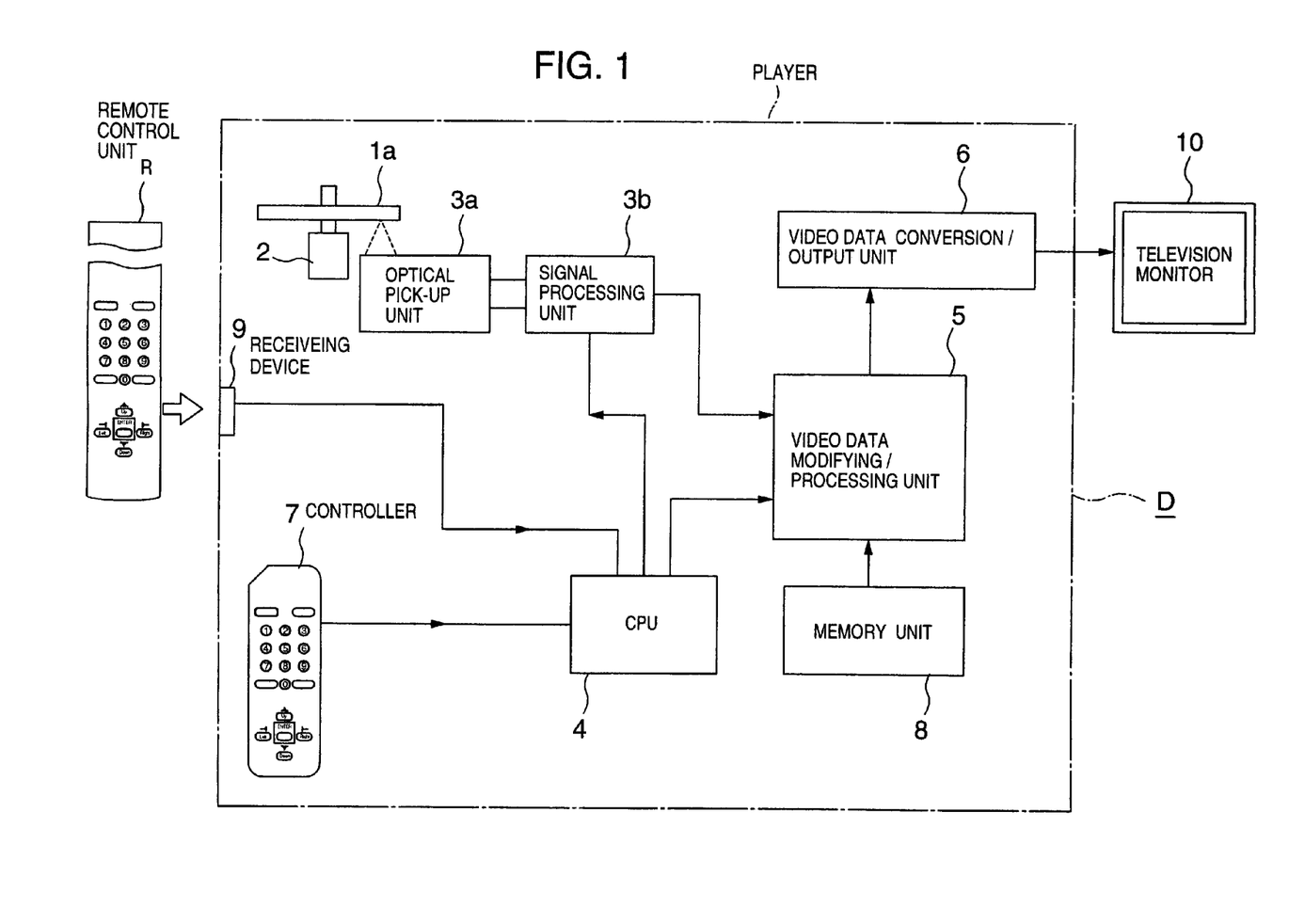
FIG. 1 is a block diagram showing a general arrangement of a DVD player according to an embodiment of the present invention.

In FIG. 1, reference character D denotes generally a main body of the DVD player (hereinafter also referred to simply as the player), and reference character R denotes generally a remote control unit designed for outputting a variety of command signals in dependence on user's key operations or manipulations of a zoom key 21 and ten keys 23 which are disposed orderly in a three-row-by-three-column or 3×3 array) so that a plurality of partitioned areas on the on-screen display of the television monitor can be visually associated with the ten key array. Needless to say, the zoom key and the ten keys are disposed on a front surface of the remote control unit R.

The DVD player or player D includes a disk motor 2 for rotating an optical disk 1a and an optical pick-up unit 3a for reading out information recorded on the optical disk 1a to thereby output a corresponding electric signal. The signal outputted from the optical pick-up unit 3a is supplied to a signal processing unit 3b which is designed to convert the output signal of the optical pick-up 3b into digital data, which in turn is then decoded to video data. A CPU (Central Processing Unit) 4 is in charge of controlling the player D as a whole. More specifically, the CPU 4 controls the disk motor 2, the optical pick-up unit 3a and the signal processing unit 3b and additionally a video data modifying/processing unit 5 in accordance with command signals received from the remote control unit R.

The video data modifying/processing unit 5 is designed to process the video data supplied from the signal processing unit 3b so that display the video data can be displayed on the screen of the monitor in various modes corresponding to various functions imparted to the DVD player. As one of such functions, there can be mentioned the zoom-in magnifying function for zooming in a given portion of a picture displayed on the screen with a preselected magnification factor in accordance with the manipulation or operation of the ten keys 23 disposed in the remote control unit R or a controller 7 which is mounted on the main body. A video encoder (hereinafter also referred to as the video data conversion/output unit) 6 serves for converting the video data into a picture signal which is then outputted to a television monitor 10 serving as the picture displaying unit. The controller 7 is incorporated in the player D and equipped with a zoom key and ten keys implemented essentially in the same specifications and serving for the same functions as those of the remote control unit R. Graphic data for display on the screen of the monitor 10 is stored in a memory device 8. A receiver device 9 serves for receiving signals transmitted from the remote control unit R in response to the key operations by the user. The DVD player, a typical one of the video apparatuses, is constituted by the devices and the units mentioned above.

For the convenience of explanation, the constituent elements 3a, 3b, 4-6 and 8 of the player are described above in block form or individually. However, in an actual device, the signal processing unit 3b may be formed of a plurality of ICs; and the element 3b or the part thereof and the video data modifying processing unit 5 may be formed of one IC. Each of the units 3b and 5 may include a memory as a work area. The video data conversion/output unit 6, CPU 4 and the memory device 8 are not always limited to independent components, respectively, and each may be formed of a single IC with the unit 3b or part thereof.

In the DVD player implemented in the structure shown in FIG. 1, the CPU 4 controls the disk motor 2, the optical pick-up unit 3a and the signal processing unit 3b in accordance with a system program. However, such controls carried out by the CPU are substantially same as those adopted in the conventional video apparatuses known heretofore. Accordingly, detailed description thereof will be unnecessary. Thus, in the following description, operations and processings for realizing the zoom-in function which features an aspect of the present invention will be elucidated by reference to a flow chart shown in FIG. 4. Incidentally, for simplification of the description, it is assumed that manipulation is realized with the aid of the remote control unit R without resorting to the controller 7 incorporated in the player D.

Figure 4:
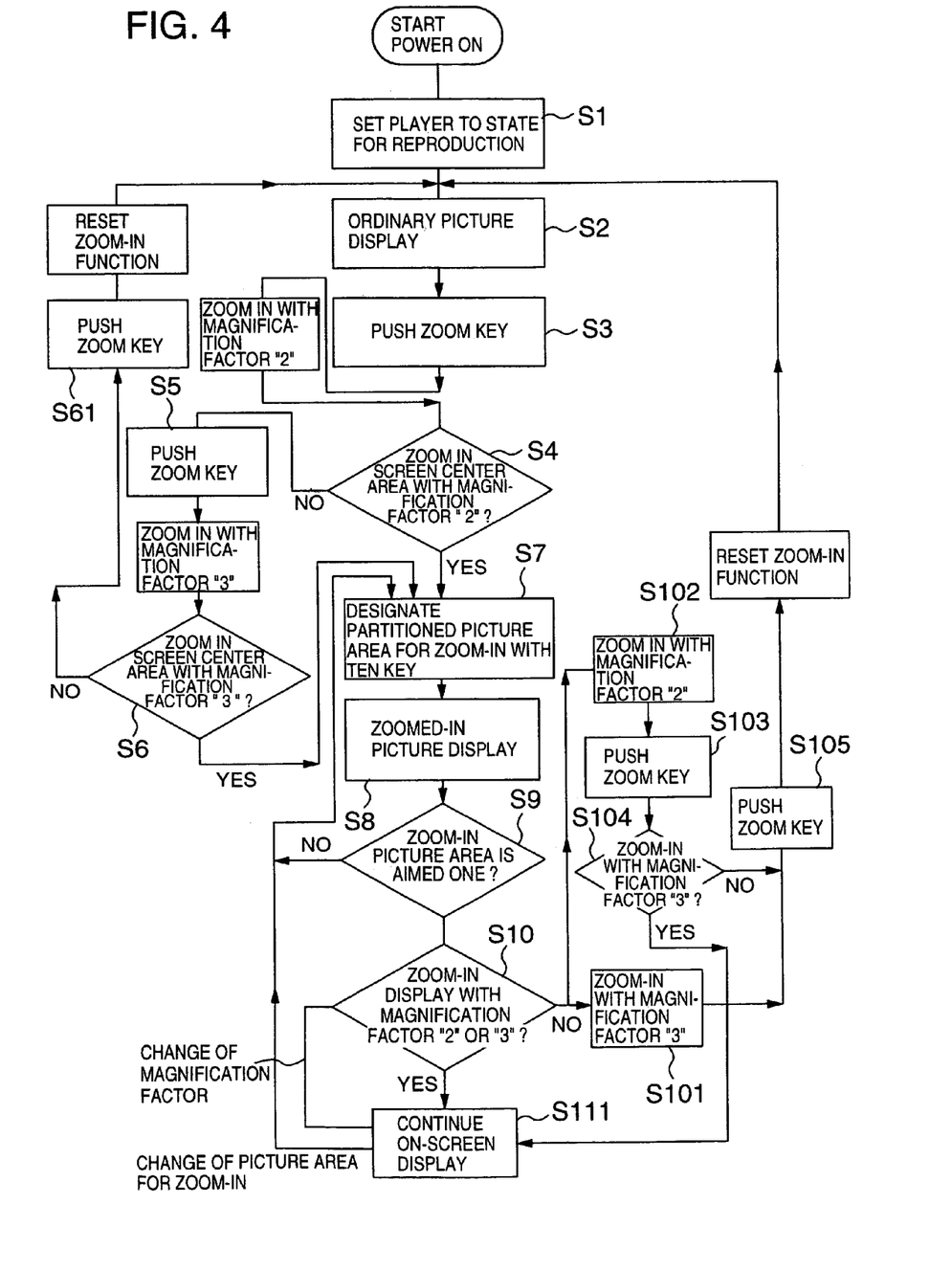
FIG. 4 is a flow chart for illustrating a zoom-in operation performed in the DVD player according to an embodiment of the present invention.

Referring to the flow chart of FIG. 4, user pushes a power-on key (not shown in FIG. 2) of the remote control unit R at first for turning on the power supply for the player D.

Subsequently, in a step S1, the user pushes a play key (not shown in FIG. 2) of the remote control unit R for starting the reproducing operation of the player D, whereby the player D is set to the reproducing state or mode.

In succession, in a step S2, a reproduction or play command signal sent from the remote control unit R is received by the receiver device 9 to be inputted to the CPU 4. In response to the command signal, the CPU 4 starts to read out and decode the video data by controlling appropriately the disk motor 2, the optical pick-up unit 3a and the signal processing/decoding unit 3b.

The video data as decoded is transferred to the video data modifying/processing unit 5. The video data transferred is converted into analog signal by the video data conversion/output unit 6 and then outputted to the television monitor 10, whereby a picture is displayed on the screen of the television monitor 10 in an ordinary mode. Parenthetically, the picture displayed in the ordinary mode will be referred to also as the ordinary picture.

The foregoing description has been made briefly only of the video data while omitting illustration and description concerning sound data because of irrelevancy to the subject matter of the present invention. However, it goes without saying that the sound information, if available from the optical disk 1a, is outputted as an audio signal after having processed by an audio decoder, a D/A (digital-to-analog) converter and others (not shown either). At this juncture, it should be noted that at the current time point, there are displayed none of cursors indicating position of a picture being displayed on the screen of the television monitor 10.

Figure 3A:
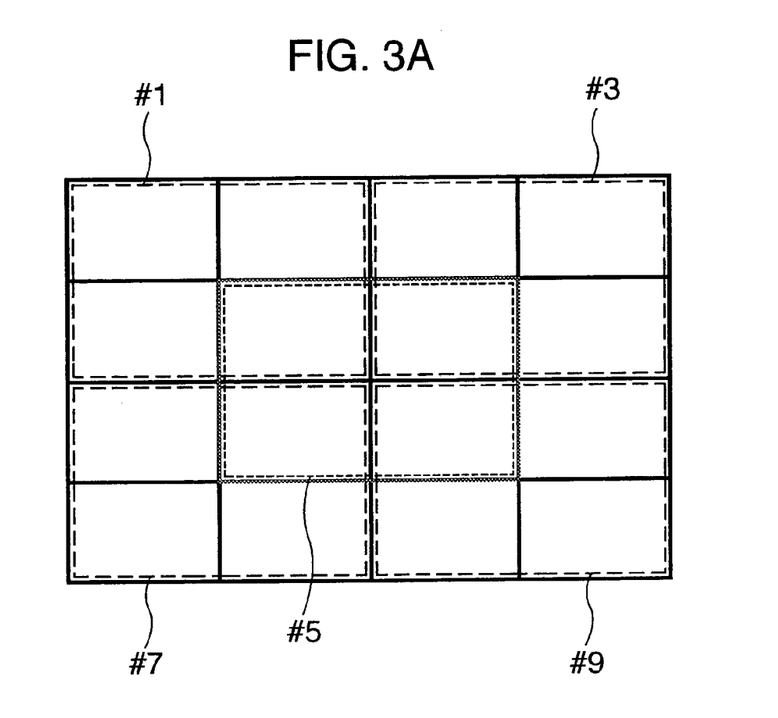
FIG. 3A shows a partitioned state of an on-screen display or full picture when a zoom-in operation is to be performed with a magnification factor "2"

As mentioned hereinbefore, the remote control unit R shown in FIG. 2 is equipped with the zoom key 21 and a three-row-by-three-column (3×3) array of ten keys labeled "1" to "9", respectively, as generally designated by reference numeral 23. On the other hand, in the player D, correspondence relations between the dispositions of the ten keys "1" to "9" in the three-row-by-three-column array and the areas resulting from partitioning of a picture or on-screen display for realizing the zoom-in magnifying function according to the invention are stored in the CPU 4 such that the ten keys disposed in the three-row-by-three-column array (23) can be visually perceptively associated with the above-mentioned areas, respectively. In this conjunction, FIG. 3A shows a partitioned state of an on-screen display or picture when the zoom-in operation is to be performed with a magnification factor "2", while FIG. 3D shows a partitioned state of a picture for the zoom-in operation with the magnification factor "3". More concretely, when the ten key labeled "1" is pushed by user, the video data modifying/processing unit 5 generates video data for a magnified or zoomed-in picture of the area #1 shown in FIG. 3A or the area #11 shown in FIG. 3D for allowing corresponding zoomed-in picture portion to be displayed with a desired magnification factor. On the other hand, when the ten key labeled "9" is pushed, the video data modifying/processing unit 5 generates the video data for a magnified picture corresponding to the picture portion in the partitioned picture area #9 shown in FIG. 3A or the area #19 shown in 3D. In this way, the zoom-in magnifying functions can be realized.

As will be appreciated from the above, by virtue of the correspondence relations established between the disposition of the ten keys in the three-row-by-three-column array and the partitioned areas of a picture for zooming such that the ten keys and the partitioned areas for zooming can be visually associated with each other, the time taken for selection of a picture portion to be viewed in the zoom-in mode through manipulation of cursor keys or buttons, as adopted in the conventional apparatus, can be spared, whereby burden imposed on the user for manipulating the cursor keys can be mitigated.

Now, turning back to the flow chart shown in FIG. 4, it is assumed that in a step S3, the user has pushed the zoom key 21 which is disposed on the remote control unit R at a left lower position and labeled with "ZOOM", as illustrated in FIG. 2.

Then, the CPU 4 activates the zoom-in magnifying function incorporated in the video data modifying/processing unit 5 in a step S4. Thus, the video data modifying/processing unit 5 generates the video data for the partitioned picture area #5 such that each of the vertical and horizontal lengths thereof is magnified about twice (about four times in terms of the area). At the same time, the CPU 4 issues a command for display of the cursors to transfer the graphic data for the cursors conforming to the zoom area from memory 8 to the video data modifying/processing unit 5. The video data modifying/processing unit 5 then combines or synthesizes the graphic data of the cursors with the video data generated as mentioned above.

Figure 3B:
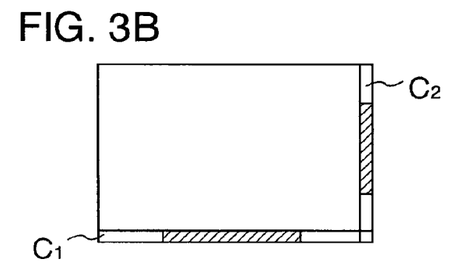
FIG. 3B is a view for illustrating zoom-in based on video data combined with cursor data, being zoomed in or magnified about twice in respect to vertical and horizontal side lengths (about four times in the area)

In the step S4, the combined or synthesized video data mentioned above is displayed, being zoomed in or magnified about twice in respect to the vertical and horizontal side lengths (about four times in the area), as is illustrated in FIG. 3B. Parenthetically, in the case of the instant embodiment of the invention, it is assumed, only by way of example, that the picture in the partitioned picture area #5 is zoomed in for display. Further, in this zoomed-in display, a clear cursor C1 is displayed at a lower side, wherein a center portion of the cursor C1 is shadowed over a half of the lower side, as can be seen in FIG. 3B. Additionally, another clear cursor C2 is displayed along the right-hand side as well, wherein a center region of the cursor C2 is shadowed over a half of the right-hand side. These cursors C1 and C2 serve to indicate the position of the zoomed-in picture area on an ordinary picture and additionally indicate implicitly the magnification factor. (In FIG. 3B, illustration of the straightforward magnification factor display which is equally possible is omitted.) By virtue of the display of the cursors such as described above, the user can easily discern that the partitioned picture area #5 of an ordinary picture is displayed, being zoomed in or magnified. In other words, user can discern at a glance which of the areas of the ordinary whole picture is being zoomed in on the screen of the picture displaying unit. Thus, burden which will otherwise be imposed on the user for identifying the picture area being currently zoomed in can be mitigated.

It is further assumed that in a step S5, the user again pushes the zoom key "ZOOM". Then, a partitioned picture area #15 of the ordinary picture illustrated in FIG. 3D is zoomed in, being magnified about three times in respect to the vertical and horizontal side lengths, respectively, (about nine times in the area), as illustrated in FIG. 3E.

Figure 3C:
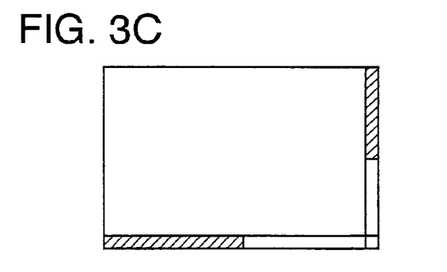
FIG. 3C is a view for illustrating cursor positions upon zoomed-in display of a picture area #1 shown in FIG. 1 with a magnification factor "2"
Figure 3D:
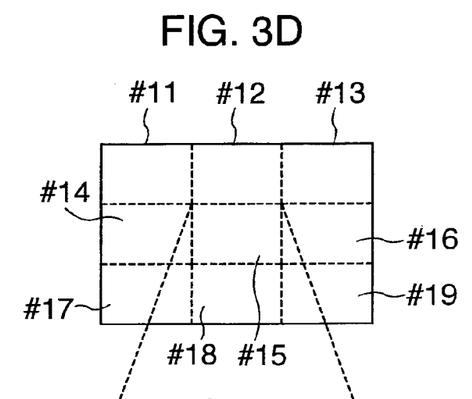
FIG. 3D shows a partitioned state of a picture for a zoom-in operation with a magnification factor "3"
Figure 3E:
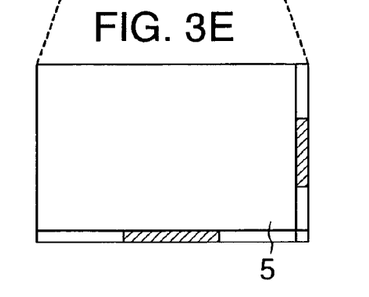
FIG. 3E is a view for illustrating zoom-in on the basis of synthesized video data, being magnified about three times in respect to the vertical and horizontal side lengths (about nine times in the area)

Additionally, the clear cursor C1 is displayed at a bottom side, wherein a center portion of the cursor C1 is shadowed over a one-third length, as can be seen in FIG. 3E. Furthermore, the clear cursor C2 is displayed along the right-hand side of the zoomed-in area #15, being shadowed over a one-third length at the center region. These cursors C1 and C2 serve to indicate the original position of the zoomed-in picture area and the magnification factor. By virtue of the cursor display described above, the user can easily recognize that the partitioned picture area #15 of the ordinary picture is zoomed in, being magnified by a factor ca. "3".

Thus, similarly to the on-screen display zoomed in by a factor "2" described previously, the user can discern at a glance which of the partitioned picture areas of the ordinary picture is being displayed, as being zoomed in, on the display screen of the picture displaying unit 10. Thus, the burden which will otherwise be imposed on the user for discerning or identifying visually discriminatively the zoomed-in picture area can be mitigated.

Parenthetically, in case the partitioned picture center area #5 of the on-screen display is not to be displayed with the magnification factor "3" in respect to the horizontal and vertical side lengths, then the user pushes the zoom key twice in succession (step S5). Then, the processing proceeds to a step S6 where decision is made as to whether the zoom-in magnifying function is to be reset. When the decision step S6 results in negation "NO", then the step S2 is resumed in response to the pushing of the zoom key by the user (step S61).

In a step S7 which succeeds to the decision step S4 when the zoom-in display with the magnification factor "2" is decided, one of the zoom-in area designating key, i.e., one of the ten keys "1" to "9" (hereinafter also referred to simply as the key) is pushed. Upon reception of the signal generated by pushing the key, the CPU 4 selects the corresponding zoom-in area, as can be seen in FIG. 3A. More specifically, in response to the signal generated upon pushing of the key "1", the CPU 4 selects a partitioned picture area #1 for zoom-in. Similarly, in response to the signal generated upon pushing of the key "2", the partitioned picture area #2 is selected by the CPU 4. Further, for the signal generated when the key "3" is pushed, the partitioned picture area #3 is selected for the zoom-in display. In response to the signal generated by pushing the key "4", the partitioned picture area #4 is selected. In the similar manner, the partitioned picture area(s) #5, #6, #7, #8 and #9 is selected for the zoom-in display by the CPU 4 in response to the signals generated upon operation of the ten key(s) "5", "6", "7", "8" or (and) "9", respectively. In any case, the picture portion(s) as selected for the zoom-in display can be discerned with the shadowed cursor length of half side length.

Further, it is assumed that the user has again pushed the zoom key. Then, the CPU 4 selects a partitioned picture area #11 for the zoom-in display in response to the signal generated upon pushing of the ten key "1", as can be seen from FIG. 3D. Similarly, in response to the signal generated upon pushing of the key "2", a partitioned picture area #12 is selected by the CPU 4. Further, for the signal generated the key "3" is pushed, a partitioned picture area #13 is selected for the zoom-in for the zoom-in display. In response to the signal generated by pushing the key "4", a partitioned picture area #14 is selected. In the similar manner, partitioned picture area(s) #15, #16, #17, #18 or (and) #19 is selected for the zoom-in display by the CPU 4 in response to the signal generated upon operation of the ten keys "5", "6", "7", "8" or (and) "9", respectively. In any case, the picture portion(s) as selected can be discerned visually perceptibly with a scale factor "⅓" in respect to the side length.

Figure 3F:
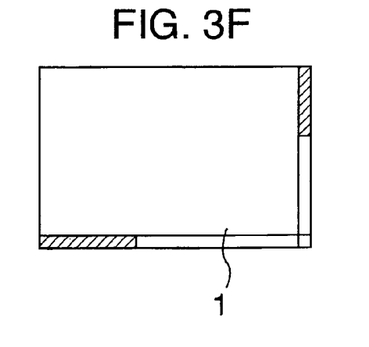
FIG. 3F is a view for illustrating cursor positions upon zoomed-in display of a picture area #15 shown in FIG. 3D with a magnification factor "3"
Figure 3G:
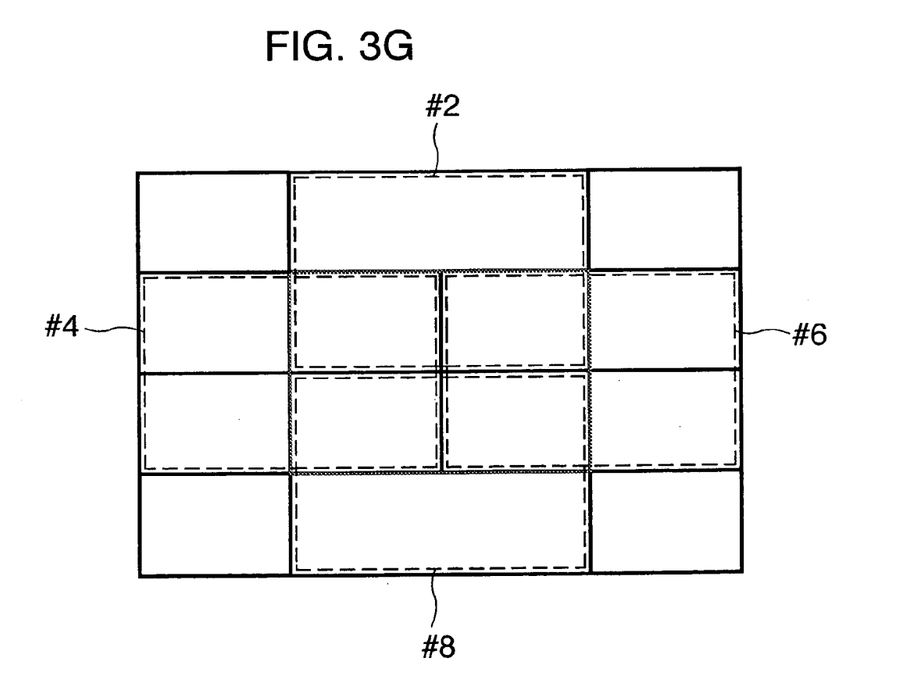
FIG. 3G shows a partitioned state of on-screen display for #2, #4, #6 and #8.

Parenthetically, in the case of the on-screen display illustrated in FIGS. 3A and 3G, the partitioned picture areas are displayed, being overlapped with one another. For example, the area #1 is an upper left portion on the picture screen; the area #3 is an upper right portion; and the area #2 is formed of the night half of the area 1 and the left half of the area #3. By contrast, illustration in FIG. 3B is based on the presumption that the ten key "5" is pushed and that a partitioned picture area corresponding to the ten key "5" is displayed, for simplification of the illustration.

Now, it is assumed that in the state where the zoomed-in picture of the center picture area #5 illustrated in FIG. 3B is being displayed, as described hereinbefore in conjunction with the step S4, the ten key "1" is pushed in the step S7. Then, the CPU 4 activates the zoom-in magnifying function of the video data modifying/processing unit 5, whereby the cursor graphic data corresponding to the upper left side section of a half length is transferred from the memory device 8 to the unit 5, whereby the synthesized video data described previously is generated.

Subsequently, in a step S8, the zoomed-in picture of the partitioned picture area #1 is displayed in such a manner, as illustrated in FIG. 3C. A clear cursor C1 is displayed at the bottom side with a left half being shadowed, while a clear cursor C2 is generated at the right side of the on-screen display with an upper half being shadowed, whereby the original position and the magnification factor of the zoomed-in picture are implicitly indicated by the positions and the lengths of the shadowed sections of the cursor C1 and C2, respectively. In the case of the DVD player according to the instant embodiment of the invention, the clear cursor display is adopted with a view to allow the zoomed-in picture to be displayed fully on the screen. It should however be understood that the purpose of the cursor display is intrinsically to make the zoomed-in area visually discernible from the others, and thus the invention is never restricted to the clear or transparent cursor images.

Next, description will be directed to a zoom-in display with magnification factor "3".

It is assumed that in the screen display state in which the partitioned picture area #15 is being displayed with magnification factor "3" in response to the repeated operation of the zoom key, as mentioned previously, the user pushes the ten key "1" in the step S7. Then, the picture of the partitioned picture area #11 corresponding to the ten key "1" is zoomed in with the side lengths being magnified by a factor "3" among the nine partitioned pictures in such a manner, as illustrated in FIG. 3F.

By the way, when it is found from confirmation of the cursor positions in the step S9 that a picture of the zoom-in area being displayed is not the picture in the user's desired area, which may be ascribable to user's erroneous key operation, the step 7 is resumed and then the key operation can be performed again for zooming in the picture in the desired picture area. In the foregoing, it has been described that selection of the partitioned picture area # to be zoomed is performed by operating or manipulating selectively the ten keys "1" to "9". It should however be mentioned that the area to be zoomed in may be moved on a bit-by-bit basis by manipulating the cursor keys 22 labeled "LEFT", "UP", "RIGHT" and "DOWN", respectively, which are disposed on a lower portion of the remote control unit, as can be seen in FIG. 2.

Now, description will be made of change-over of the on-screen display in the state where a partitioned picture area is being displayed with the magnification factor "2" or "3" in a step S10. In the on-screen display of a picture area zoomed in with the magnification factor "3" generated in the step S101, it is assumed that the user has pushed the zoom key 21 in a succeeding step S105. In that case, the zooming function is reset or cleared, and hence the step S2 is resumed. On the other hand, in the on-screen display of a picture zoomed in with the magnification factor "2" as generated in a step S102, it is assumed that the zoom key 21 is pushed in a succeeding step S103. In that case, the on-screen display of a zoom-in picture with the magnification factor "3" is generated in a succeeding step S104, similarly to the case of the step S6, whereupon the processing can proceed to a continuous display step S111. Thereafter, procedure processing by way of the step S7, the step S8, the step S9 and so forth are executed.

In case the on-screen display of a picture zoomed in with the magnification factor "3" is to be changed (step S104), the processing proceeds to the step S105 mentioned previously for resetting the zoom-in magnifying function, whereupon the step S2 is resumed.

When the on-screen display of the picture zoomed in with the magnification factor "2" or the picture zoomed in with the magnification factor "3" is to be continued, this can be realized by leaving the keys intact (step S111). When the user wants to change the zoom-in area in the course of the continuous on-screen display, he or she can renewedly designate the zoom-in area or position with the aid of the ten keys "1" to "9" which serve as the zooming area designating keys.

Embodiment 2

A second embodiment of the present invention will now be described. The DVD player according to the second embodiment of the invention bears similarity to the first embodiment described above by reference to FIGS. 1 to 4 in many respects. Accordingly, the following description will be directed to the arrangement which differs from that of the first embodiment by referring to a flow chart illustrated in FIG. 5.

Figure 5:
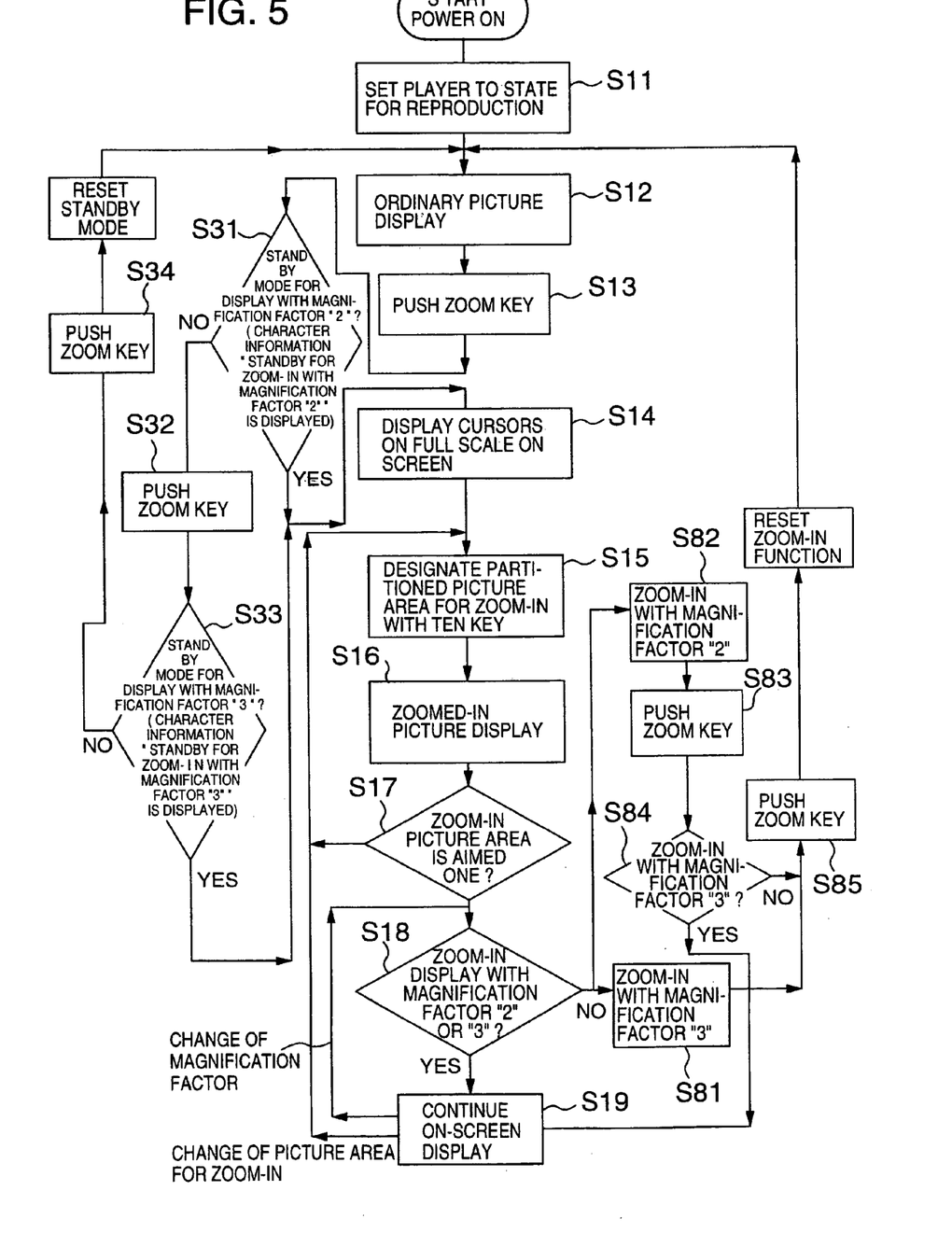
FIG. 5 is a flow chart for illustrating a zoom-in operation performed in a DVD player according to another embodiment of the invention.

It is first to be mentioned that in the flow chart shown in FIG. 5, start step of turning on the power supply as well as steps S11, S12 and S13 are essentially same as the power-on step as well as the steps S1, S2 and S3, respectively, which have been described hereinbefore in conjunction with the first embodiment by reference to FIG. 4.

In the DVD player according to the second embodiment of the invention, when the zoom key of the remote control unit R is pushed by user (step S13), the CPU 4 is set to the standby mode for the on-screen display with magnification factor "2" and subsequently identifies the ten keys "1" to "9" as the keys dedicated to the zoom-in magnifying function.

On the other hand, the video data modifying/processing unit 5 uses the graphic data for the cursors C1 and C2 (hereinafter also referred to simply as the full-scale cursors) transferred from the memory device 8 to thereby generate the combined or synthesized video data as described previously in conjunction with the first embodiment, as a result of which the cursors of scale are displayed with a full scale on the screen (step S14). Additionally, character information such as "standby for zoom-in with a magnification factor "2"" or the like may be displayed (step S14). Owing to these displays, user can easily recognize that the DVD player is in the zoom-in standby mode and that a picture zoomed in with the magnification factor "2" can be displayed by pushing a corresponding one of the keys "1" to "9". Thus, burden imposed on the user for zooming in his or her desired partitioned picture area can be mitigated.

When the user wants to change the standby mode for the zoom-in with magnification factor "2", he or she pushes again the zoom key of the remote control unit R (step S32). Then, the CPU 4 is set to a standby mode for zoom-in with a magnification factor "3" in a step S31. In this state, the CPU 4 recognizes the ten keys "1" to "9" which will be pushed subsequently by the user as the zoom-in function dedicated keys. In this case, similarly to the case of the standby mode for the zoom-in with the magnification factor "2" described above, character information such as "standby for zoom-in with magnification factor "3"" or the like may be additionally displayed on the screen.

When user wants to reset the standby mode for the zoom-in with the magnification factor "3", he or she pushes once more the zoom key (step S34). Then, the standby mode is reset, whereupon the processing returns to the step S12.

In a step S15, the user pushes one of the keys "1" to "9" for selecting the desired partitioned picture area from the full on-screen display. Correspondence relations between the keys "1" to "9" and the partitioned picture areas for zoom-in, respectively, are same as in the case of the DVD player according to the first embodiment of the invention.

A processing step S17 to a step S19 in the flow chart of FIG. 5 are similar to the step S7 to the step S111 described hereinbefore in conjunction with the first embodiment. Further, a processing step S81 to a step S85 are same as the step S101 to the step S105.

As is apparent from the foregoing, the DVD player according to the second embodiment of the invention is so arranged that the zoomed-in picture is displayed after having been set to the standby mode when compared with the DVD player according to the first embodiment of the invention. By virtue of such arrangement, a partitioned picture area of a moving picture to be zoomed in for display can be selected through a single operation of a corresponding one of the keys "1" to "9" at the moment when user wants to view while watching the full-scale moving picture. Thus, the DVD player according to the second embodiment of the invention can ensure enhanced manipulatability for users.

Embodiment 3

A third embodiment of the present invention will now be described. The DVD player according to the third embodiment of the invention bears similarity to the first embodiment of the invention described previously by reference to FIGS. 1 to 4 in many respects. Accordingly, the following description will be directed to the arrangement which differs from the first embodiment by referring to a flow chart shown in FIG. 6.

Figure 6:
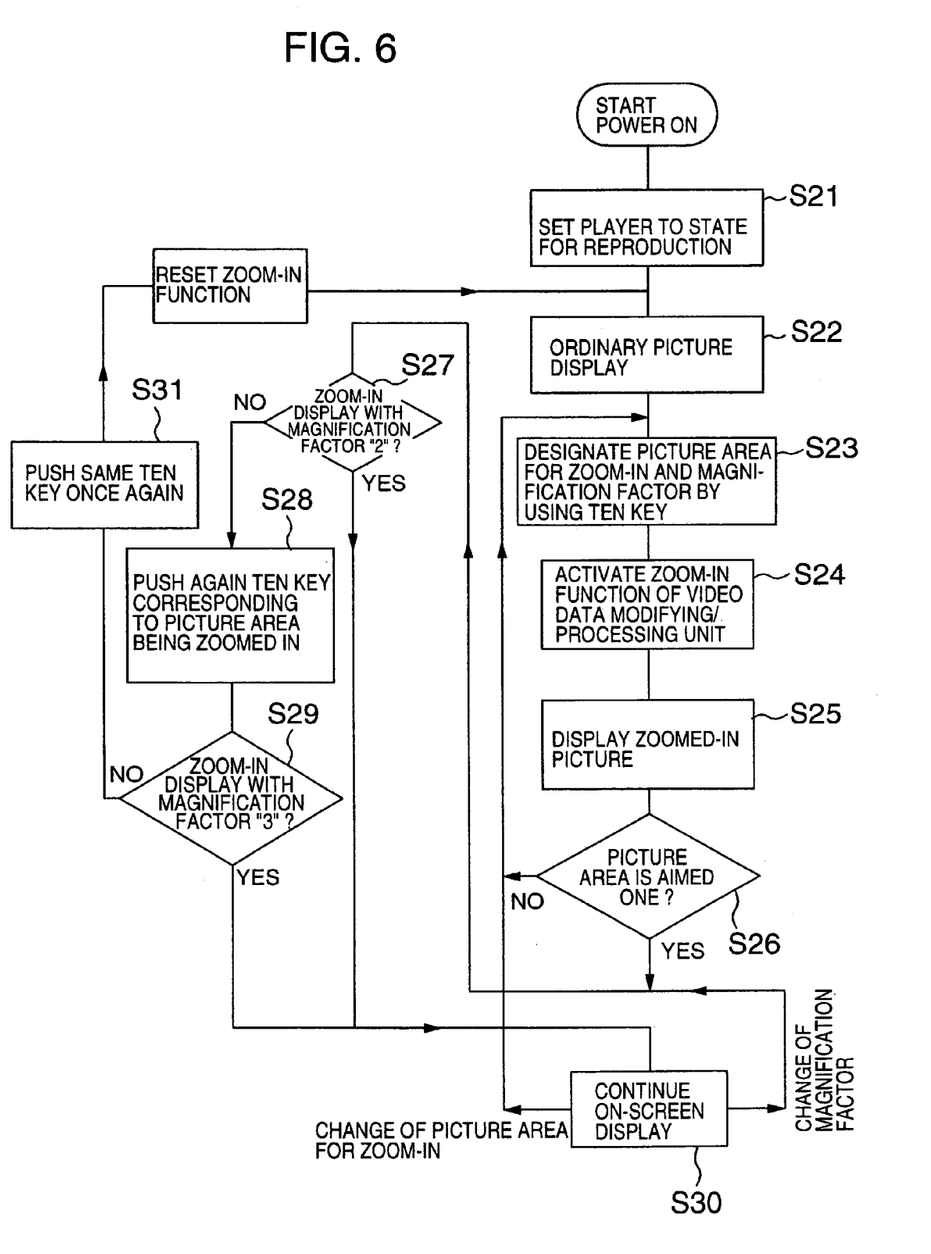
FIG. 6 is a flow chart for illustrating a zoom-in operation performed in a DVD player according to yet another embodiment of the invention.

It is first to be mentioned that in the flow chart of FIG. 6, the start step of turning on the power supply as well as steps S21 and S22 are essentially same as the start step of turning on the power supply as well as the steps S1 and S2, respectively, which have been described hereinbefore in conjunction with the first embodiment by reference to FIG. 4.

In the DVD player according to the instant embodiment of the invention, the zoom key is not used. The partitioned picture portion or area which the user wants to zoom in is selected from the full picture by pushing straightforwardly the corresponding one of the ten keys "1" to "9" (step S23). Then, the zoom-in function of the video data modifying/processing unit 5 is activated in a step S24. In this conjunction, correspondence relations between the partitioned picture portions or areas and the ten keys "1" to "9", respectively, are same as in the case of the DVD player according to the first embodiment of the invention described hereinbefore. Succeeding steps S25 and S26 are substantially similar to the processing steps S8 and S9 for the zoom-in display with magnification factor "2" in the DVD player according to the first embodiment of the invention.

The display of the selected picture area zoomed in with magnification factor "2" can be confirmed by the user (step S27) and may be left intact as the continuous display (step S30).

When the display zoomed in with magnification factor "2" is to be changed over, then the user pushes again the ten key corresponding to the picture area to be zoomed in which is indicated by the cursors (step S28). The partitioned picture area of concern is then displayed with magnification factor "3" (step S29). This display with the zoom-in factor "3" can be continued as user desires. Since the change of the magnification factor, the zoom-in area and the resetting of the zoom-in function can be realized by using the same ten key instead of the zoom key while following the substantially same procedure as described hereinbefore. Accordingly, repetitive description thereof will be unnecessary.

With the DVD player according to the instant embodiment of the invention, the picture to be zoomed in can be displayed speedily without using the zoom key when compared with the DVD players according to the first and second embodiments.

At this juncture, it should however be mentioned that such restriction is imposed that during the ordinary reproducing operation, the ten key operated straightforwardly for the zoom-in magnifying function can not be used for the other function(s) than the zoom-in function. By way of example, user may desire to change over the chapter of a motion or moving picture to another one during the ordinary reproducing operation. By way of example, the user wants to change over to a chapter "5" of a moving picture being viewed. In that case, in the DVD player according to the instant embodiment of the invention, it is impossible to resort to such procedure of pushing the ten key labeled "5" and then the decision key "ENTER" as a method of selecting the chapter "5". The user must set the DVD player to another mode for the chapter selection and then push the ten key for the zoom-in function. Of course, in practical applications, the problem mentioned above may be solved without difficulty by providing the remote control unit R and/or the controller 7 a chapter selecting key "CHAPTER" and by programming the chapter selecting procedure, for example, such that the button "CHAPTER", the ten key "5" and the decision key "ENTER" are pushed in this sequence.

Furthermore, although the foregoing description of the DVD players according to the embodiments of the invention has been made on the assumption that the keys or buttons installed in the remote control unit R are used for realizing the desired functions, it goes without saying that the keys or buttons provided in the controller 7 may be used essentially to the same effects. Of course, the zoom keys and the ten keys of both the remote control unit R and the controller 7 may be used alternately or selected as user desires, substantially to the same effects.

Besides, the DVD players described herein-before are only for the purpose of illustration. Many various modifications may be conceived by those skilled in the art without departing from the spirit and scope of the present invention. By way of example, the key allocation to zoom-in area, the magnification factors and the zoom-in procedures described hereinabove may be altered or modified without difficulty by preparing correspondingly the system program to be preset.

Embodiment 4

A fourth embodiment of the present invention is directed to a DVD player which is imparted with a function capable of displaying a given partitioned picture area with zoom-in magnification in the state in which other partitioned picture area is being displayed with magnification.

As described hereinbefore, when the partitioned picture area to be zoomed in is changed over to another desired area, the user designates the latter by using the cursor key or the ten key serving as the zoom-in area designating key. Then, the corresponding data are fetched and processed for displaying the desired picture area while zooming in the same with the magnification factor "2" or "3".

In this conjunction, it should first be mentioned that the DVD player according to the instant embodiment of the invention is so designed that for changing the partitioned picture area for the zoom-in display, the desired partitioned picture area to be zoomed in is not straight-forwardly displayed but a partitioned picture area linking or intervening between the partitioned picture area displayed before the picture area change command is issued and the partitioned picture area designated for the zoom-in display is first displayed, whereon the desired partitioned picture area to be zoomed in is then displayed.

The concept underlying the DVD player according to the instant embodiment of the invention will be described in detail by reference to FIG. 3D, FIG. 4, FIG. 5 and FIG. 6.

In the description which follows, it is assumed, only by way of example, that in the state where the picture in the partitioned area #11 shown in FIG. 3D is being displayed with zoom-in magnification factor "3", the picture area change command to the picture area #19 is issued in response to the corresponding manipulation of the remote control unit R by the user.

In this conjunction, it should be recalled that in the case of the DVD players according to the first to third embodiments described hereinbefore, when the command for zooming in the picture in the picture area #19 is issued (see step S7 in FIG. 4, step S15 in FIG. 5 or step S23 in FIG. 6) in the state where the picture in the partitioned area #11 is being displayed as zoomed in (see step S111 in FIG. 4, step S19 in FIG. 5 or step S30 in FIG. 6), the data for the picture area #19 is fetched to be processed for displaying the corresponding picture in that area (see step S8 in FIG. 4, step S16 in FIG. 5 or step S25 in FIG. 6).

By contrast, in the DVD player according to the instant embodiment is so arranged that an additional step is executed in precedence to the step of fetching the data for the picture area #19 to display the picture of that area by zooming in (see step S8 in FIG. 4, step S16 in FIG. 5 or step S25 in FIG. 6). In this additional step, position or location of a picture in an area which is preferably to be displayed upon changing over the picture (picture area #11) displayed before the picture change command for the picture (picture area #19) is issued by user, i.e., the position or location of the picture area (#15 in the case of the instant embodiment) which intervene between or linking the picture area #11 and the picture area #19 is arithmetically determined on the basis of the positional relation between the picture area currently displayed (area #11) and the picture area to which the display is to be changed over (area #19). Incidentally, arithmetical determination of the position or location of the picture area to be preferably displayed in the course of picture area change-over procedure can be carried out by the CPU 4 while the data for displaying the intervening picture can be generated by the video data modifying/processing unit 5. Alternatively, correspondence relations between the picture area displayed currently and the picture area to which the zoom-in display is to be changed over on one hand and the intervening picture area on the other hand may be previously prepared in the form of a table and stored to be referenced by the CPU 4.

Figure 8:
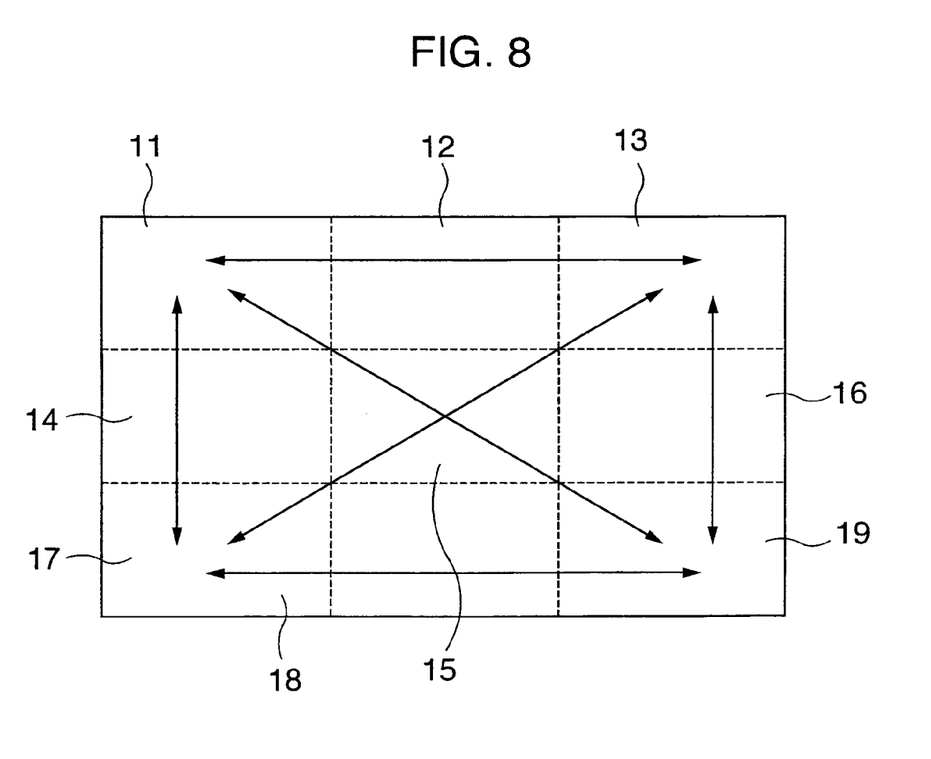
FIG. 8 is a view for illustrating correspondence relations among picture areas to be changed over and picture areas intervening between the picture areas to be changed over.

The above-mentioned correspondence relations among the picture areas are illustrated, by way of example, in FIG. 8. As can be seen in this figure, when the zoom-in display is to be changed over from the partitioned picture area #11 to the picture area #13, the picture in the area #13 can be zoomed in after the picture in the intervening area #12 has been displayed. Similarly, when the zoom-in display is to be changed over from the partitioned picture area #11 to the picture area #17, the picture in the area #17 can be zoomed in after the picture in the area #14 has been displayed. In this conjunction, it should further be added that the number of the intervening picture areas to be displayed in the change-over process is not limited to one but two or more intervening picture areas may be displayed. For example, let's assume that the picture area #11 being displayed as zoomed in is to be changed over to the picture area #19 for the zoom-in display. In that case, there may be displayed not only the picture area #15 but also a picture area intervening between the picture areas #11 and #15 and/or a picture area intervening between the picture areas #15 and #19.

Figure 9:
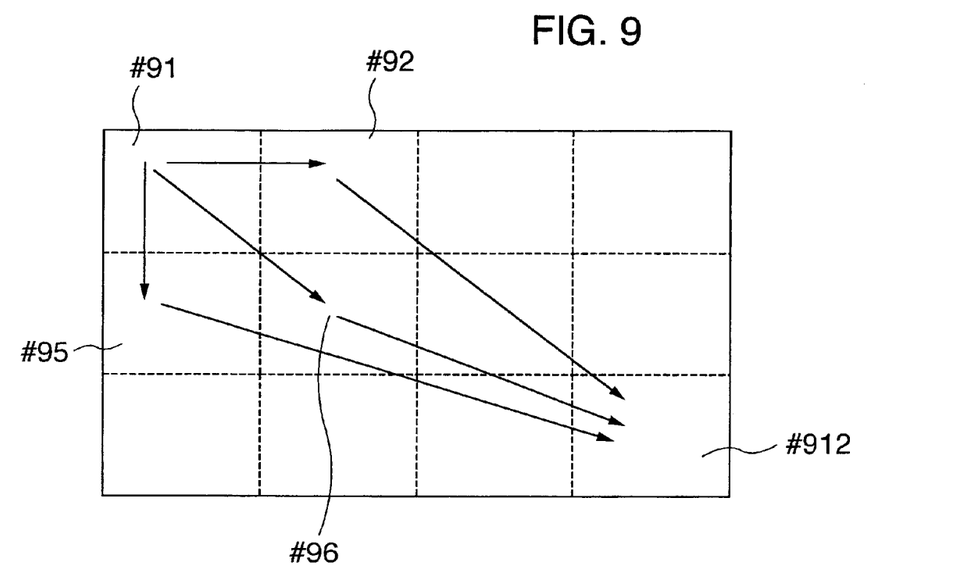
FIG. 9 is a view for illustrating correspondence relations similar to FIG. 8 in the case where picture areas for zooming in are partitioned more finely.
Figure 10:
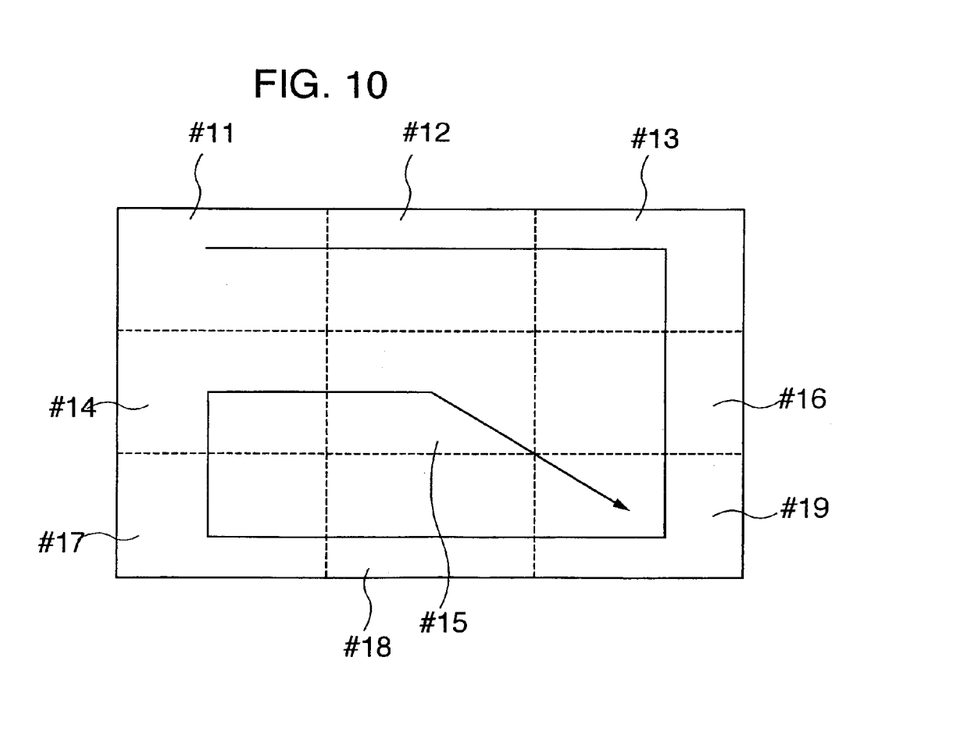
FIG. 10 is a view for illustrating a procedure for displaying sequentially all areas of a whole picture previously when a given one area being displayed is to be changed over to another given picture area according to yet another embodiment of the present invention.

Similar correspondence relations in the case where the picture areas to be zoomed in are partitioned more finely is illustrated in FIG. 9.

In the case of the zoom-in display of the partitioned picture areas exemplified in FIG. 9, it is assumed that a partitioned picture area #91 is to be changed over to an area #912. In that case, any one of picture areas #92, #95 and #96 which are located in the vicinity of a line linking the position of the picture area #91 and that of the picture area #912 may be displayed in precedence to the zoom-in display of the picture in the picture area #912. Essentially, same concept applies valid in the case where the picture areas for the zoom-in display partially overlap one another, as in the case of the example illustrated in FIG. 3A.

With the arrangement of the DVD player according to the instant embodiment of the invention such that upon change-over of the picture areas for zoom-in display, the destination picture area as designated by user is not straightforwardly displayed but intervening picture area(s) between the currently displayed picture area and the destination picture area is displayed, the picture areas for zoom-in display can be changed visually smoothly without bringing about uncomfortableness or abruptness in the scenery perception of the user.

Now, another exemplary procedure for changing a picture area being currently zoomed in to another picture area (i.e., modification of the fourth embodiment of the invention) will be described.

It is assumed, only by way of example, that the zoom-in display of the picture area #11 with magnification factor "3" illustrated in FIG. 3D is to be changed over to the picture area #19 in response to the user's command.

It is taught according to the concept of the invention incarnated in this modification that before the currently displayed picture area is changed over to the destination picture area designated by the user, all the picture areas of a full picture are once displayed as the zoom-in pictures, starting from the currently displayed picture area, and thereafter the destination zoomed-in picture designated by the user is displayed.

In this case, the DVD player according to the instant embodiment is also so arranged that an additional step is executed in precedence to the step of fetching the data for the picture area #19 to display the picture of that area by zooming in (see step S8 in FIG. 4, step S16 in FIG. 5 or step S25 in FIG. 6). In the additional step mentioned above, when the zoom-in area change command is issued, the nine zoomed-in picture areas are sequentially displayed over the whole picture. In other words, the zoomed-in pictures in the partitioned areas are displayed sequentially clockwise and along circulatively, starting from the zoom-in area partitioned picture area #11. More specifically, starting from the partitioned picture area #11, the partitioned picture areas #12, #13, #16, #19, #18, #17, #14 and #15 are all displayed sequentially clockwise circulatively, after which the picture in the picture area #19 designated by the suer is displayed finally, being zoomed in. In this conjunction, the control for the clockwise sequential display of the partitioned area pictures may be performed by the CPU 4 while the data for the zoomed-in pictures may be generated by the video data modifying/processing unit 5.

Although it has been described that in the DVD player now under consideration, the pictures in the all partitioned areas are displayed sequentially clockwise, starting from the picture area displayed before the change-over command is issued, it goes without saying that the sequential display may be performed counter-clockwise. Besides, the number of the partitioned picture areas for the zoom-in display is not restricted to nine. By way of example, the DVD player may equally be so arranged that a picture area intervening between adjacent areas can be displayed. In that case, the number of the picture areas for zoom-in increases, which in turn contributes to visually smoother change-over of the picture areas for the zooming-in.

As is apparent from the foregoing, by virtue of the arrangement of the DVD player described above that all the picture areas are displayed sequentially before the destination picture area to be zoomed in is displayed, the user can discern easily at which position in the whole picture the destination picture area is located. To say in another way, the user can visually recognize easily the picture area to be displayed next without need for displaying all the picture areas one by one through his or her manipulation. Thus, the convenience of use or manipulatability of the DVD player can be enhanced.

As will now be understood from the foregoing description, the present invention has provided the video apparatuses which can mitigate burden imposed on the user in operation or manipulation of the apparatus while enabling the location or position of the picture area being zoomed in on the screen as well as the magnification factor thereof to be discerned clearly by the user.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, in the foregoing description, it has been assumed that the ten keys of a remote control unit which are imparted with other functions such as the chapter selection are used as the zoom-in area designating keys. However, it is obvious for those in the skilled art that the keys destined for the zoom-in area designation may be provided additionally in the remote control unit or the controller. Of course, a remote control unit destined for the zoom-in function incarnating the teachings of the invention may be provided separately. Further, the number of the zoom-in area designating keys as well as that of the picture areas is never limited to nine.

Accordingly, all suitable modifications and equivalents may be resorted to, falling within the spirit and scope of the invention.

What is claimed is:

1. A picture processing method for generating magnified picture data based on original picture data recorded on a recording medium, comprising:

reproducing said original picture data from said recording medium as a pre-zoom picture;

dividing by a picture data processor, the pre-zoom picture into a total of M×N (where M and N are integers) partial areas indicative of selectable zoom-in areas;

holding correspondence relations between a plurality of M×N zoom-In area designating keys disposed at least on either one of a main body of said image apparatus or a remote control unit thereof, and the M×N partial areas of the picture on a screen based on said original picture data, respectively; and generating said magnified picture data, based on said original picture data, corresponding to a given one of said M×N zoom-in area designating keys in response to operation of said given one of said M×N zoom-in area designating keys, wherein the plurality of M×N zoom-in area designating keys are arrayed orderly such that the array of said plurality of M×N zoom-in area designating keys can be associated with a plurality of said M×N partial areas of the picture on the screen.

2. A picture processing method according to claim 1, wherein said plurality of M×N zoom-in area designating keys used for designating a location to be zoomed in when said zoom key is singly operated, while being used for other purposes than the designation of the location for zoom-in after another key is operated in precedence, said M×N zoom-in area designating keys including keys labeled "1 to 9" for the purpose of ten keys, respectively, and disposed in a three-row-by-three-column (3×3) array.

3. A picture processing method for displaying magnified picture on a screen based on original picture data recorded on a recording medium, comprising:

reproducing said original picture data from said recording medium as a pre-zoom picture;

dividing by a picture data processor, the pre-zoom picture into a total of M×N (where M and N are integers) partial areas indicative of selectable zoom-in areas;

holding correspondence relations between a plurality of M×N zoom-in area designating keys disposed at least on either one of a main body of an image apparatus effecting the method or a remote control unit thereof, and the M×N partial areas of the picture on a screen based on said original picture data, respectively; and displaying on said screen said magnified picture based on said original picture data, corresponding to a given one of said M×N zoom-in area designating keys in response to operation of said given one M×N zoom-in area designating key, wherein the plurality of M×N zoom-in area designating keys are arrayed orderly such that the array of said plurality of M×N zoom-in area designating keys can be associated with a plurality of said M×N partial areas of the picture on the screen.

4. A picture processing method according to claim 3, wherein said plurality of M×N zoom-in area designating keys used for designating a location to be zoomed in when said zoom key is singly operated, while being used for other purposes than the designation of the location for zoom-in after another key is operated in precedence, said M×N zoom-in area designating keys including keys labeled "1" to "9" for the purpose of ten keys, respectively, and disposed in a three-row-by-three-column (3×3) array.

5. A picture processing method for reading out a first picture data from a recording medium and processing the first picture data to thereby derive second picture data for generating a zoomed-in picture on a screen by magnifying a partial area of a pre-zoom picture based on the first picture data, said picture processing method comprising the steps of:

dividing by a picture data processor the pre-zoom picture into a total of M×N (where M and N are Integer) partial areas indicative of selectable zoom-in areas;

providing a plurality of M×N zoom-in area designating keys disposed at least on either one of a main body of said picture apparatus or a remote control unit;

holding in a storage correspondence relations between said plurality of M×N zoom-in area designating keys and said plurality of M×N partial areas of the pre-zoom picture of the screen; and generating in said picture data processor the second picture data corresponding to an operated one of said zoom-in area designating keys;

wherein relative locations of said plurality of M×N zoom-in area designating keys with respect to one another substantially correspond to relative locations of the plurality of M×N partial areas with respect to one another of the pre-zoom picture on the screen.

6. A picture processing method according to claim 3, wherein said plurality of M×N zoom-in area designating keys used for designating a location to be zoomed in when said zoom key is singly operated, while being used for other purposes than the designation of the location for zoom-in after another key is operated in precedence, said M×N zoom-in area designating keys including keys labeled "1" to "9" for the purpose of ten keys, respectively, and disposed in a three-row-by-three-column (3×3) array.

* * * * *